(12) United States Patent
Babazadeh

(10) Patent No.: US 10,423,504 B2
(45) Date of Patent: Sep. 24, 2019

(54) COMPUTER ARCHITECTURE FOR MITIGATING TRANSISTOR FAULTS DUE TO RADIATION

(71) Applicant: The Boeing Company, Chicago, IL (US)

(72) Inventor: Alexander Shyon Babazadeh, Bothell, WA (US)

(73) Assignee: The Boeing Company, Chicago, IL (US)

( * ) Notice: Subject to any disclaimer, the term of this patent is extended or adjusted under 35 U.S.C. 154(b) by 223 days.

(21) Appl. No.: 15/669,493

(22) Filed: Aug. 4, 2017

(65) Prior Publication Data

US 2019/0042376 A1    Feb. 7, 2019

(51) Int. Cl.
| | | |
|---|---|---|
| *G06F 11/00* | (2006.01) | |
| *G06F 11/18* | (2006.01) | |
| *G06F 11/16* | (2006.01) | |

(52) U.S. Cl.
CPC ........ *G06F 11/184* (2013.01); *G06F 11/1658* (2013.01); *G06F 11/1675* (2013.01)

(58) Field of Classification Search
CPC .................................................. G06F 11/184
USPC ....................... 714/10, 11, 12, 13, 14, 31, 32
See application file for complete search history.

(56) References Cited

U.S. PATENT DOCUMENTS

| | | | |
|---|---|---|---|
| 6,901,540 B1* | 5/2005 | Griffith, Jr. | ......... G06F 11/1016 711/206 |
| 6,938,183 B2 | 8/2005 | Bickel | |
| 8,037,356 B2* | 10/2011 | Rasmussen | .............. G05B 9/03 370/249 |
| 8,489,919 B2* | 7/2013 | Clark | .................... G06F 9/3867 714/10 |
| 2007/0260939 A1* | 11/2007 | Kammann | .......... G06F 11/0739 714/48 |
| 2009/0089642 A1* | 4/2009 | Miles | ................... H03M 13/118 714/752 |
| 2009/0183035 A1* | 7/2009 | Butler | ................. G06F 11/1497 714/48 |

* cited by examiner

*Primary Examiner* — Dieu Minh T Le
(74) *Attorney, Agent, or Firm* — Vivacqua Law

(57) ABSTRACT

A transmitting computer for a vehicle is disclosed, and includes a command circuit, a monitor circuit, and a master circuit. The command circuit receives a real-time signal and executes a first set of instructions to analyze the real-time signal, and generates a plurality of command signals based on executing the first set of instructions. The monitor circuit receives the command signals and the real-time signal. The monitor circuit executes a second set of instructions to analyze the real-time signal and generates a plurality of replica signals based on executing the second set of instructions. The monitor circuit generates an initial reset command in response to determining an initial miscompare between one of the plurality of command signals and the plurality of replica signals. The master circuit is in communication with both the command circuit and the monitor circuit and receives an indication that the initial reset command is generated.

20 Claims, 4 Drawing Sheets

Master Hardware Counter ~70

| | Value |
|---|---|
| Transmitter A — 32 | 1 ←—78A | —72A |
| Transmitter B — 32 | 0 ←—78B | —72B |
| Transmitter C — 32 | 0 ←—78C | —72C |
| Hardware Counter Value | 1 ←— 76 | |

FIG. 2

Local Hardware Counter ~80

| | Value |
|---|---|
| Transmitter A — 32 | 1 ←— 88A | —82A |
| Transmitter B — 32 | 0 ←— 88B | —82B |
| Transmitter C — 32 | 0 ←— 88C | —82C |

FIG. 3

COMPUTER ARCHITECTURE FOR MITIGATING TRANSISTOR FAULTS DUE TO RADIATION

FIELD

The disclosed system and method relate to a computer architecture for mitigating the effects of radiation and, more particularly, to a computer including a master circuit for disabling specific circuits in response to the specific circuits generating a threshold number of errors created by radiation.

BACKGROUND

Transient faults in semiconductors may be caused by a variety of sources such as transistor variability, thermal cycling, or radiation that is external to the semiconductor chip. Radiation-induced transient faults may be caused by alpha particles from packaging as well as neutron flux from the atmosphere. Neutron flux varies based on altitude. Specifically, the neutron flux is attenuated at lower altitudes, but increases at higher altitudes. For example, the neutron flux is about three and a half times higher in a mountainous region such as Denver, Colo. when compared to a location at sea level. Furthermore, neutron flux is significantly higher at aircraft altitude when compared to the neutron flux at sea level. Aircraft altitude is typically about 40,000 feet (12,192 meters) on average, but varies based on various factors such as, but not limited to, the type of aircraft, weight, the length of the flight, and atmospheric conditions.

Due to advances in technology, hardware circuits for aviation applications may now utilize smaller semiconductors that also include faster switching rates. However, these semiconductors tend to be more susceptible to the radiation effects that are normally experienced at aircraft altitude when compared to older legacy systems. This may cause one or more single event upsets, which changes the value of a bit in a transistor. For example, the value of a bit may be switched from 0 to 1, which may comprise various data calculations performed by the circuit. Accordingly, there exists a need to mitigate the effects of radiation on flight control hardware circuits.

SUMMARY

In one example, a transmitting computer for a vehicle is disclosed, and includes a command circuit, a monitor circuit, and a master circuit. The command circuit receives a real-time signal and executes a first set of instructions to analyze the real-time signal, and generates a plurality of command signals based on executing the first set of instructions. The monitor circuit receives the command signals and the real-time signal. The monitor circuit executes a second set of instructions to analyze the real-time signal and generates a plurality of replica signals based on executing the second set of instructions. The monitor circuit generates an initial reset command in response to determining an initial miscompare between one of the plurality of command signals and the plurality of replica signals. The master circuit is in communication with both the command circuit and the monitor circuit and receives an indication that the initial reset command is generated. In response to receiving the indication, the master circuit records subsequent signals that each indicate another miscompare has been determined. In response to receiving a number of reset commands from the monitor circuit equal to a threshold error value during the average mission time, the master circuit generates a disable signal that instructs the command circuit and the monitor circuit to cease operation.

In another example, a vehicle including a plurality of subscribing computers and a transmitting computer in communication with the subscribing computer is disclosed. The transmitting computer includes a command circuit, a monitor circuit, and a master circuit. The command circuit receives a real-time signal and executes a first set of instructions to analyze the real-time signal, and generates a plurality of command signals based on executing the first set of instructions. The monitor circuit receives the command signals and the real-time signal. The monitor circuit executes a second set of instructions to analyze the real-time signal and generates a plurality of replica signals based on executing the second set of instructions. The monitor circuit generates an initial reset command in response to determining an initial miscompare between one of the plurality of command signals and the plurality of replica signals. The master circuit is in communication with both the command circuit and the monitor circuit and receives an indication that the initial reset command is generated. In response to receiving the indication, the master circuit records subsequent signals that each indicate another miscompare has been determined. In response to receiving a number of reset commands from the monitor circuit equal to a threshold error value during the average mission time, the master circuit generates a disable signal that instructs the command circuit and the monitor circuit to cease operation.

In yet another example, a method for operating a computer of a vehicle is disclosed. The method includes receiving a real-time signal by a command circuit. The method also includes executing, by the command circuit, a first set of instructions to analyze the real-time signal to generate a plurality of command signals. The method further includes receiving the plurality of command signals and the real-time signal by a monitor circuit. The method includes generating, by the monitor circuit, a plurality of replica signals based on executing a second set of instructions to analyze the real-time signal. In response to determining an initial miscompare between one of the plurality of command signals and the plurality of replica signals, the method includes generating an initial reset command by the monitor circuit. The method includes recording, by a master circuit, subsequent signals received during an average flight time in response to the monitor circuit generating the initial reset command. Finally, the method includes sending a disable signal to both the command circuit and the monitor circuit in response to receiving a number of reset commands from the monitor circuit equal to a threshold error value during an average mission time of the vehicle.

Other objects and advantages of the disclosed method and system will be apparent from the following description, the accompanying drawings and the appended claims.

BRIEF DESCRIPTION OF THE DRAWINGS

FIG. 2 is an exemplary block diagram of a hardware counter of the master circuit of the transmitting computer shown in FIG. 1;

FIG. 3 is an exemplary block diagram of a local hardware counter of the monitor circuit of the transmitting computer shown in FIG. 1;

DETAILED DESCRIPTION

Figure 1:
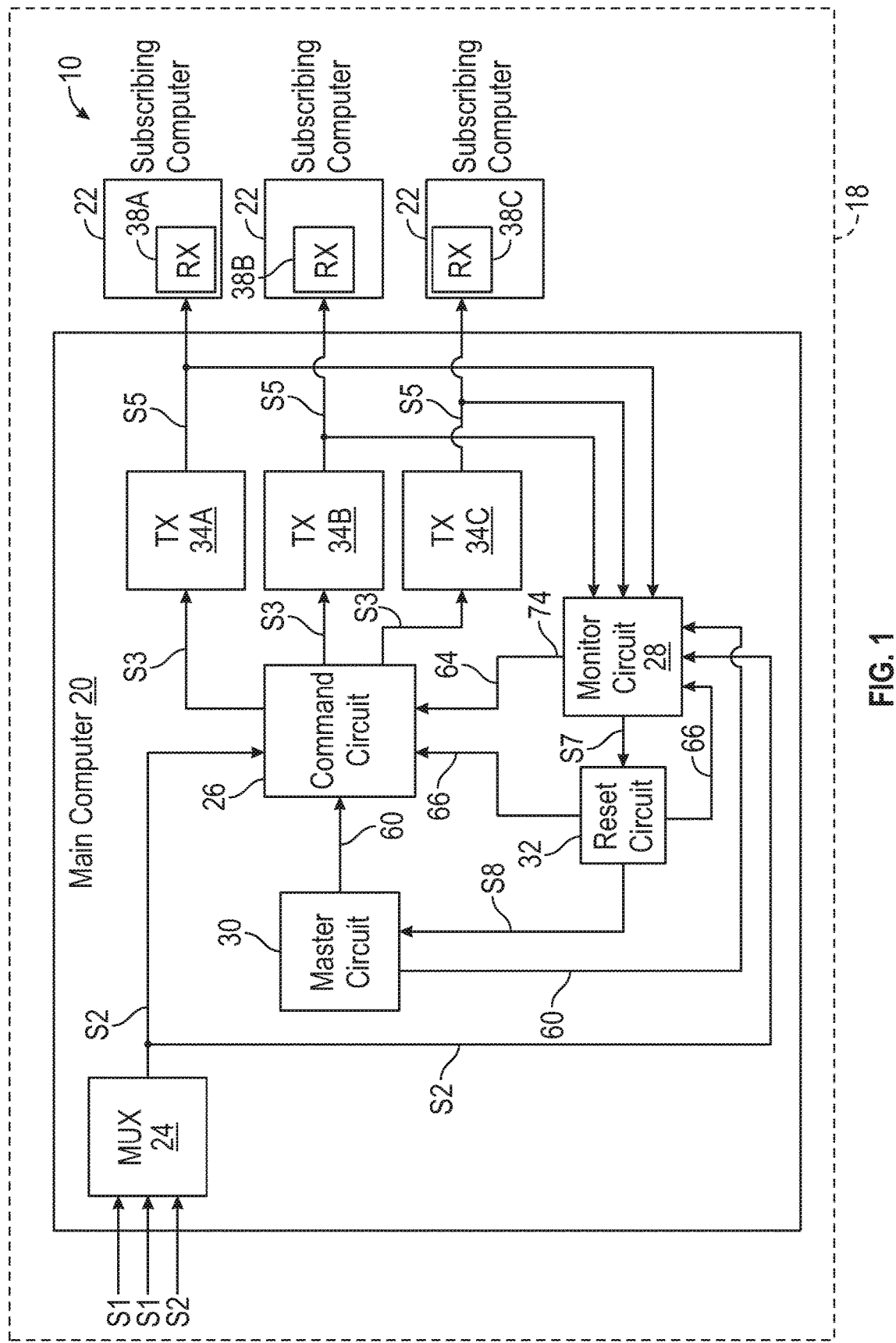
FIG. 1 is an exemplary schematic block diagram of a system having a transmitting computer in communication with a plurality of subscribing computers, where the transmitting computer includes a command circuit, a monitor circuit, a reset circuit, and a master circuit.

FIG. 1 is an exemplary schematic block diagram of a system 10 having a main or transmitting computer 20 in communication with a plurality of subscribing computers 22. The transmitting computer 20 receives a plurality of signals S1 from various sensors (not shown), which represent real-time data. In the embodiment as shown, the system 10 is located upon a vehicle 18 and the signals S1 represent various operating parameters of the vehicle 18. The vehicle 18 represents any machine used in land or air that is used to transport goods or people such as, but not limited to, an aircraft or a space vehicle. The transmitting computer 20 includes a multiplexer 24, a command circuit 26, a monitor circuit 28, a master circuit 30, a reset circuit 32, and a plurality of transmitters 34. The transmitters 34 are each in communication with a corresponding receiver 38 of one of the subscribing computers 22. As explained below, the transmitting computer 20 mitigates the effects of radiation upon various transistors (not illustrated) within the command circuit 26 and the monitor circuit 28.

The multiplexer 24 receives as input the signals S1 from the sensors (not shown). The multiplexer 24 generates as output a multiplexed signal S2 based on the input signals S1. Thus, the multiplexed signal S2 also represents real-time data. The multiplexed signal S2, which is also referred to as a real-time signal, is sent to both the command circuit 26 and the monitor circuit 28. Thus, the command circuit 26 and the monitor circuit 28 both receive the same multiplexed signal S2 as input. Moreover, the command circuit 26 and the monitor circuit 28 also process the multiplexed signal S2 in an identical manner and simultaneously with respect to one another.

In one exemplary embodiment, the command circuit 26 and the monitor circuit 28 are both field programmable gate arrays (FPGAs). However, the command circuit 26, the monitor circuit 28, master circuit 30, and the reset circuit 32 may also refer to, or be part of, an application specific integrated circuit (ASIC), an electronic circuit, a combinational logic circuit, a FPGA, a processor (shared, dedicated, or group) comprising hardware or software that executes code, or a combination of some or all of the above, such as in a system-on-chip.

The command circuit 26 executes a first set of instructions to analyze the multiplexed signal S2 (i.e., the real-time signal), and generates a plurality of command signals S3 based on executing the first set of instructions. In one embodiment, the first set instructions executed by the command circuit 26 include transforming the multiplexed signal S2 into the command signals S3. Each command signal S3 includes specific instructions intended for one of the subscribing computers 22.

Each command signal S3 generated by the command circuit 26 is sent to a corresponding one of the transmitters 34. Accordingly, each command signal S3 is unique to the corresponding transmitter 34, and the transmitters 34 each receive as input a unique command signal S3 that is in digital form. In one embodiment, the command signals S3 are sent to the transmitters 34 at specific refresh rates that are unique to each transmitter 34. Each transmitter 34 then transforms the unique command signal S3 into a digital signal S5 that is sent to a corresponding receiver 38 of one of the subscribing computers 22. Each subscribing computer 22 includes circuitry downstream of a corresponding receiver 38 (not illustrated), where the circuitry reads and processes the digital signal S5 received from the transmitting computer 20. Although a wired connection is described, in another embodiment the transmitters 34 transform the command signals S3 into electromagnetic waves. Specifically, the digital command signals S3 are transformed into radio frequency signals that are sent to the receivers 38 via antennas (not illustrated).

The monitor circuit 28 receives as input the digital signals S5 from the transmitters 34 and the multiplexed signals S2 from the multiplexer 24, where the digital signals S5 convey identical data as the command signals S3. The monitor circuit 28 executes a second set of instructions to analyze the multiplexed signal S2. The second set of instructions are identical to the first set of instructions executed by the command circuit 26. The monitor circuit 28 executes a second set of instructions to analyze the multiplexed signal S2 or real-time signal and generates a plurality of replica signals based on executing the second set of instructions. The first set of instructions executed by the command circuit 26 and the second set of instructions executed by the monitor circuit 28 are performed simultaneously with respect to one another. The replica signals match the command signals S3 as long as the command circuit 26 and the monitor circuit 28 are both functioning normally and without introducing one or more single event upsets. A single event upset is the creation of a flipped bit in a transistor, and is typically caused by radiation. The single event upset changes the value of a bit in a transistor (i.e., from 0 to 1).

The monitor circuit 28 compares the command signals S3 with the replica signals. In response to the command signals S3 and the replica signals matching one another, the monitor circuit 28 performs no further action and continues to monitor both the command signal S3 and the replica signal. However, in response to determining an initial miscompare, the monitor circuit 28 generates an initial reset command S7. A miscompare represents the monitor circuit 28 determining one or more command signals S3 are different than the replica signals. The initial reset command S7 is sent to the reset circuit 32. In addition to the initial reset command S7, the monitor circuit 28 also initiates a local hardware counter 80 (shown in FIG. 3) in response to determining the initial miscompare between the command signals S3 and the replica signals, and is explained in greater detail below.

The reset circuit 32 is independent of both the command circuit 26 and the monitor circuit 28, and provides an indication to reinitialize the command circuit 26 and the monitor circuit 28. Specifically, in response to receiving the initial reset command S7, the reset circuit 32 transmits a clearing or reinitializing command 66 to both the command circuit 26 and the monitor circuit 28. The reinitializing command 66 instructs the command circuit 26 and the monitor circuit 28 to restart or reinitialize. The reinitialization brings the command circuit 26 and the monitor circuit 28 to normal conditions or an initial state, and clears any pending errors or events such as, for example, a single event upset. The command circuit 26 and the monitor circuit 28 are both reinitialized simultaneously. The command circuit 26 and the monitor circuit 28 also resume operation at the same time.

The monitor circuit 28 also sends a disable command 64 to the command circuit 26 in response to the command signals S3 not matching the replica signals. The disable command 64 instructs the command circuit 26 to disable the transmitters 34 until the reinitialization of both the command circuit 26 and the monitor circuit 28 are complete and normal operation is resumed.

In response to receiving the initial reset command S7, the reset circuit 32 also generates an initial signal S8, which is sent to the master circuit 30. The initial signal S8 indicates that the initial reset command S7 was sent to the command circuit 26 and the monitor circuit 28, and a reinitialization has occurred. As explained in greater detail below, in response to receiving the initial signal S8, the master circuit 30 records subsequent signals S8 from the reset circuit 32 by a master hardware counter 70 (illustrated in FIG. 2). That is, the master circuit 30 receives an indication that the initial reset command S7 is generated. In response to receiving the indication, the master circuit 30 records the subsequent signals S8, which each indicate another miscompare has been determined by the monitor circuit 28.

The master circuit 30 continues to record the subsequent signals S8 using the master hardware counter 70 for a predetermined amount of time that is referred to as the average mission time of the vehicle 18. In other words, the master circuit 30 records the subsequent signals S8 that are received during the average mission time of the vehicle 18 in response to the monitor circuit 28 generating the initial reset command S7. As mentioned above, the initial reset command S7 provides an indication to reinitialize the command circuit 26 and the monitor circuit 28.

In one embodiment, the average mission time represents an average flight time of a specific model of an aircraft. The average flight time typically depends upon the specific model of aircraft, where larger aircraft tend to stay in flight longer when compared to smaller aircraft. For example, in one embodiment the average flight time for a relatively large aircraft is about twelve hours. The average flight time is referred to as the average mission time since the system 10 is not limited to an aircraft and may be used in other applications such as space exploration. The average mission time of a space vehicle is usually significantly longer than an aircraft flight. After reinitialization of the command circuit 26 and the monitor circuit 28, the reset circuit 32 generates subsequent signals S8 in response to receiving another reset command S7 from the monitor circuit 28.

The command circuit 26 and the monitor circuit 28 include a plurality of transistors (not illustrated in the figures). In one embodiment, the transistors are relatively small in size when compared to legacy transistors that have been used in conventional applications. Because of their relatively small size, the transistors may be especially susceptible to the radiation effects that are normally experienced at average aircraft altitude (i.e., typically about 40,000 feet or 12,192 meters), or in outer space. Accordingly, the transistors may experience errors like a single event upsets. A single event upset changes the value of a bit in a transistor. For example, radiation may switch the value of the bit from 0 to 1. Thus, it is possible for the transistors to alter the calculations performed by the command circuit 26 and the monitor circuit 28 due to the effects of radiation at elevated altitudes or in outer space. The reinitialization process clears any pending errors in the command circuit 26 and the monitor circuit 28. Reinitializing the command circuit 26 and the monitor circuit 28 temporarily removes current from the transistors (not shown), and causes the transistors to return to their normal state (i.e., to 0). The command circuit 26 and the monitor circuit 28 are both reinitialized simultaneously.

As seen in FIG. 2, the master hardware counter 70 includes a set of special-purpose registers 72 to store the number of miscompares. Referring now to FIGS. 1 and 2, the master hardware counter 70 stores a bit value 78 in a corresponding register 72. Each register 72 corresponds to one of the transmitters 34. For example, register 72A corresponds to transmitter 34A, register 72B corresponds to transmitter 34B, and register 72C corresponds to transmitter 34C. The bit values 78 each represent the number of miscompares that have occurred during the average mission time for a specific transmitter 34. Although transmitters are described in the present example and shown in FIG. 2, the embodiment is merely exemplary in nature and the disclosure is not limited to monitoring the number of miscompares in transmitters. Indeed, the registers 72 may store the miscompares created by other types of circuits as well.

The master hardware counter 70 also stores a hardware counter value 76, which is a sum of all the bit values 78 stored in each of the registers 72. The hardware counter value 76 represents the number of reset commands S7 generated by the monitor circuit 28 during the average mission time. In other words, the hardware counter value 76 represents the number of miscompares determined by the monitor circuit 28 during the average mission time.

Referring to FIG. 1, the monitor circuit 28 also sends the initial reset command S7 to the reset circuit 32 in response to determining the initial miscompare. In response to receiving the reset command S7, the reset circuit 32 generates the signal S8 sent to the master circuit 30. In response to receiving the initial signal S8, the master hardware counter 70 increments one of the bit values 78 stored in a corresponding register 72 (FIG. 2). For example, the transmitter 34A creates the initial miscompare. Thus, as seen in FIG. 2 the bit value 78A stored in register 72A is incremented from 0 to 1, since the transmitter 34A (FIG. 1) created the initial miscompare.

In addition to generating the initial reset command S7 in response to determining the initial miscompare, the monitor circuit 28 also initiates the local hardware counter 80, which is shown in FIG. 3. Referring to both FIGS. 1 and 3, the local hardware counter 80 includes a plurality of registers 82 that each correspond to one of the transmitters 34 of the command circuit 26. Specifically, register 82A corresponds to the transmitter 34A, the register 82B corresponds to the transmitter 34B, and the register 82C corresponds to the transmitter 34C. The local hardware counter 80 stores a bit value 88 in a corresponding register 82, where the bit values 88 each represent the number of miscompares that have occurred during the average mission time for a specific transmitter 34. The local hardware counter 80 increments a bit value 88 stored in the register 82 that corresponds to the transmitter 34 that created the initial miscompare between the command signals S3 and the replica signals. In the present example, the bit value 88A stored in register 82A is incremented from 0 to 1 since the transmitter 34A (FIG. 1) created the initial miscompare. The bit values 88 of the local hardware counter 80 remain intact after initialization of the monitor circuit 28.

Referring to FIG. 1, once an initialization of both the command circuit 26 and the monitor circuit 28 is complete, the command circuit 26 continues operation and sends data to the subscribing computers 22. The monitor circuit 28 continues to compare the command signals S3 with the replica signals. In response to the command signals S3 and the replica signals matching one another, the monitor circuit 28 performs no further action and continues to monitor both the command signals S3 and the replica signals. In response to the command signals S3 not matching the replica signals, which is referred to as a first subsequent miscompare, the monitor circuit 28 increments the local hardware counter 80 (FIG. 3) again, which is described below.

Operation of the master hardware counter 70 of the master circuit 30 as well as the local hardware circuit of the monitor circuit 28 is now explained. Referring to FIG. 1, in response to determining the first subsequent miscompare, the monitor circuit 28 then determines the specific transmitter 34 that generated the first subsequent miscompare. For example, the specific transmitter 34A creates the first subsequent miscompare.

Referring now to both FIGS. 1 and 3, in response to one of the bit values 88 stored in a corresponding one of the registers 82 being incremented more than one time, the monitor circuit 28 disables the specific transmitter 34 corresponding to the first subsequent miscompare. In other words, a specific one of the transmitters 34 is disabled in response to incrementing one of the bit values 88 stored in a corresponding register 82 more than once during the average mission time. In the present example, transmitter 34A creates the first subsequent miscompare. Accordingly, the monitor circuit 28 increments the value of the register 82A from 1 to 2. In response to the bit value 88A of the register 82A being incremented more than once (i.e., from 1 to 2), the monitor circuit 28 sends a disable signal 74 to the command circuit 26. The disable signal 74 instructs the command circuit 26 to disable the transmitter 34 that generates more than one miscompare. Thus, the transmitter 34A, which corresponds to the first subsequent miscompare, is disabled. This is because the transmitter 34A probably has a hardware failure that is not created by radiation, since it is highly unlikely that any of the transmitters 34 would create more than one miscompare during the average mission time. Since there is a hardware fault, the transmitter 34A continues to create errors even after reinitialization.

In addition to sending the disable signal 74, in response to determining the first subsequent miscompare the monitor circuit 28 also sends another subsequent reset command S7 to the reset circuit 32. In response to receiving the subsequent reset command S7, the reset circuit 32 sends another subsequent signal S8 to the master circuit 30. Since the master circuit 30 already received the initial signal S8 from the reset circuit 32, and the master hardware counter 70 shown in FIG. 2 is already incremented once (i.e., the bit value 78A is 1). Accordingly, in response to receiving the subsequent signal S8, the master circuit 30 increments the bit value 78 of the register 72 of the master hardware counter 70 corresponding to the transmitter 34 that generated the first subsequent miscompare. In the specific example as described, the bit value 78A of the register 72A of the master hardware counter 70 is incremented from 1 to 2 and the hardware counter value 76 is now 2.

Referring to both FIGS. 1 and 2, once the hardware counter value 76 is equal to a threshold error value, the master circuit 30 generates a disable signal 60 that instructs the command circuit 26 and the monitor circuit 28 to cease operation. In other words, the master circuit 30 generates the disable signal 60 in response to receiving a number of reset commands from the monitor circuit 28 that are equal to a threshold error value during the average mission time. Determination of the threshold error value is explained in greater detail below, and is based on physical characteristics of the transistors, the average altitude that is normally experienced by the vehicle 18, and the average flight or mission time. The disable signal 60 is sent to both the command circuit 26 and the monitor circuit 28 to cease operation because of the numerous calculation errors created by radiation. Once the command circuit 26 and the monitor circuit 28 cease operation, the transmitting computer 20 is effectively removed from the system 10.

The monitor circuit 28 continues to compare the command signals S3 with the replica signals until either the hardware counter value 76 shown in FIG. 2 reaches the threshold error value and the monitor circuit 28 is disabled, or until the average mission time has elapsed. Determination of the threshold error value, which is representative of a maximum value of the hardware counter value 76 of the master circuit 30, is now described. The threshold error value is based on physical characteristics of transistors included within the command circuit 26 and the monitor circuit 28, the average altitude experienced by the vehicle 18, and the average mission time.

The physical characteristics of the transistors include an effective area $A_{eff}$. The effective area $A_{eff}$ is determined based on a channel width W and an effective channel length $L_{eff}$ of a specific transistor, where the channel of the specific transistor connects a source to a drain of the transistor. Specifically, the effective area $A_{eff}$ is determined by the following equation: $A_{eff}=W*L_{eff}$. The effective area $A_{eff}$ represents a portion of the specific transistor that is susceptible of creating an altered state or flipped bit due to the effect of radiation caused by neutron particle collision. The higher the effective area $A_{eff}$ of a transistor, the more susceptible the transistor is to radiation effects. The threshold error value is also based on the average altitude experienced by the vehicle 18, since higher altitudes result in greater radiation, and therefore the transistors tend to generate more miscompares. For example, a smaller aircraft that operates a lower altitudes will experience fewer flipped bits when compared to a space vehicle. Finally, the threshold error also depends upon the average mission time of the vehicle 18, as a longer mission is susceptible to more errors.

Referring generally to FIGS. 1-3, the disclosed computer architecture mitigates the effects of radiation upon transistors that are relatively sensitive to the effects of elevated radiation levels. Elevated radiation occurs when the computer is at aircraft altitude or is in outer space. The disclosed computer architecture also provides an approach to monitor, control, reset, and disable specific circuits of the transmitting computer in response to detecting miscompares created by radiation. Furthermore, the system also includes a feature to disable a specific circuit or transmitter of the computer in the event that miscompares are being generated due to a hardware failure instead of radiation. Conventional systems do not directly address the effects of radiation upon transistors, and instead utilize radiation-blocking materials such as, for example, lead to attenuate radiation. However, materials such as lead introduce significant weight to the system, which can be especially problematic in weight sensitive applications such as aircraft or space vehicles. In contrast, the disclosed approach does not typically require the use of heavy materials or components for protection against radiation.

Figure 4:
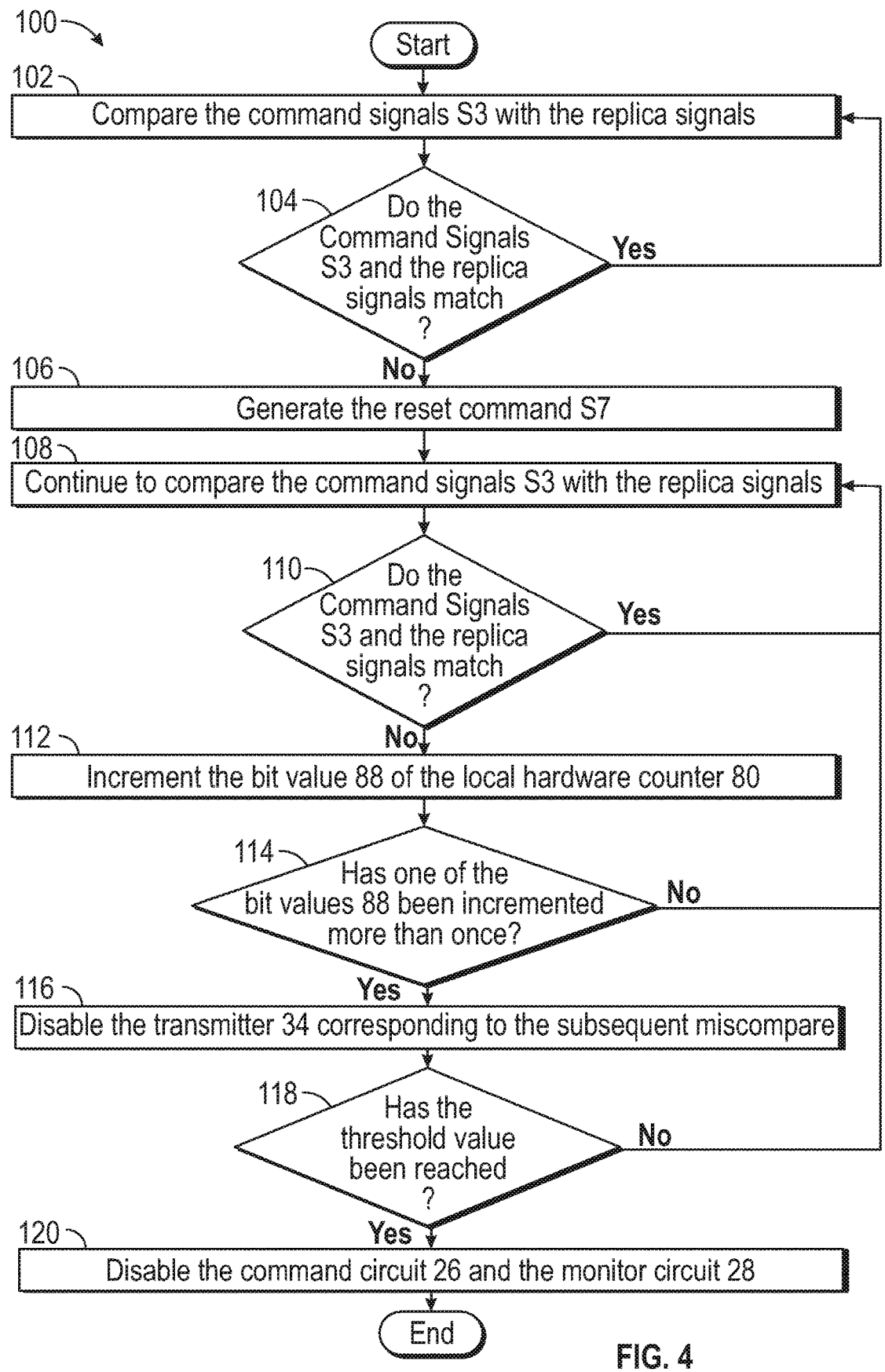
FIG. 4 is an exemplary process flow diagram illustrating a method of operating the transmitting computer shown in FIG. 1 to mitigate the effects of radiation.

FIG. 4 is an exemplary process flow diagram illustrating a method 100 to operate the system 10 and in particular the transmitting computer 20 to mitigate the effects of radiation upon various transistors of the command circuit 26 and the monitor circuit 28. Referring generally to FIGS. 1-4, the method 100 begins at block 102. In block 102, the monitor circuit 28 compares the command signals S3 created by the command circuit 26 with the replica signals. The method 100 then proceeds to a decision block 104.

In decision block 104, in response to the command signals S3 and the replica signals matching one another, the method 100 returns to block 102, and continues to monitor both the command signal S3 and the replica signal. However, in response to one or more of the command signals S3 not matching one of the replica signals, the method 100 proceeds to block 106.

In block 106, the monitor circuit 28 generates the reset command S7, which instructs the command circuit 26 and the monitor circuit 28 to restart. The monitor circuit 28 also increments the local hardware counter 80 shown in FIG. 3. The reset circuit 32 also sends the initial signal S8 to the master circuit 30. In response to the master circuit 30 receiving the initial signal S8, one of the bit values 78 stored in a corresponding register 72 of the master hardware counter 70 (FIG. 2) that corresponds to the transmitter 34 generating the initial miscompare is incremented. Method 100 may then proceed to block 108.

In block 108, the monitor circuit 28 compares the command signals S3 created by the command circuit 26 with the replica signals. The method 100 then proceeds to a decision block 110.

In decision block 110, in response to the command signals S3 and the replica signals matching one another, the method 100 returns to block 108, and continues to monitor both the command signal S3 and the replica signal. However, in response to one or more of the command signals S3 not matching one of the replica signals, the method 100 proceeds to block 112.

In block 112, the monitor circuit 28 increments the bit value 88 of the register 82 of the local hardware register 82 corresponding to the specific transmitter 34 creating the first subsequent miscompare. For example, the specific transmitter 34A creates the first subsequent miscompare. Accordingly, the bit value 88A of the register 82A of the local hardware counter 80 shown in FIG. 3 is incremented from 1 to 2. The method 100 may then proceed to decision block 114.

In decision block 114, the monitor circuit 28 determines if the bit values 88 of any of the registers 82 of the local hardware counter 80 have been incremented more than once. In response to none of the bit values 88 being incremented more than once, the method returns back to block 108 and the monitor circuit 28 compares the command signals S3 created by the command circuit 26 with the replica signals. In response to the bit value 88 of one of the registers 82 of the local hardware counter 80 being incremented more than once, the method 100 proceeds to block 116.

In block 116, the monitor circuit 28 sends the disable signal 74 to the command circuit 26, which instructs the command circuit 26 to disable the transmitter 34 associated with creating more than one miscompare. Method 100 may then proceed to decision block 118.

In decision block 118, in response to the hardware counter value 76 of the master hardware counter 70 being less than the threshold error value, the method returns to block 108 and the monitor circuit 28 continues to compare the command signals S3 with the replica signals. However, in response to the hardware counter value 76 being equal to the threshold error value, the method 100 proceeds to block 120.

In block 120, the master circuit 30 sends the disable signal 60 to both the command circuit 26 and the monitor circuit 28. The disable signal 60 instructs the command circuit 26 and the monitor circuit 28 to cease operation, and the transmitting computer 20 is removed from the system 10. The method 100 may then terminate.

Figure 5:
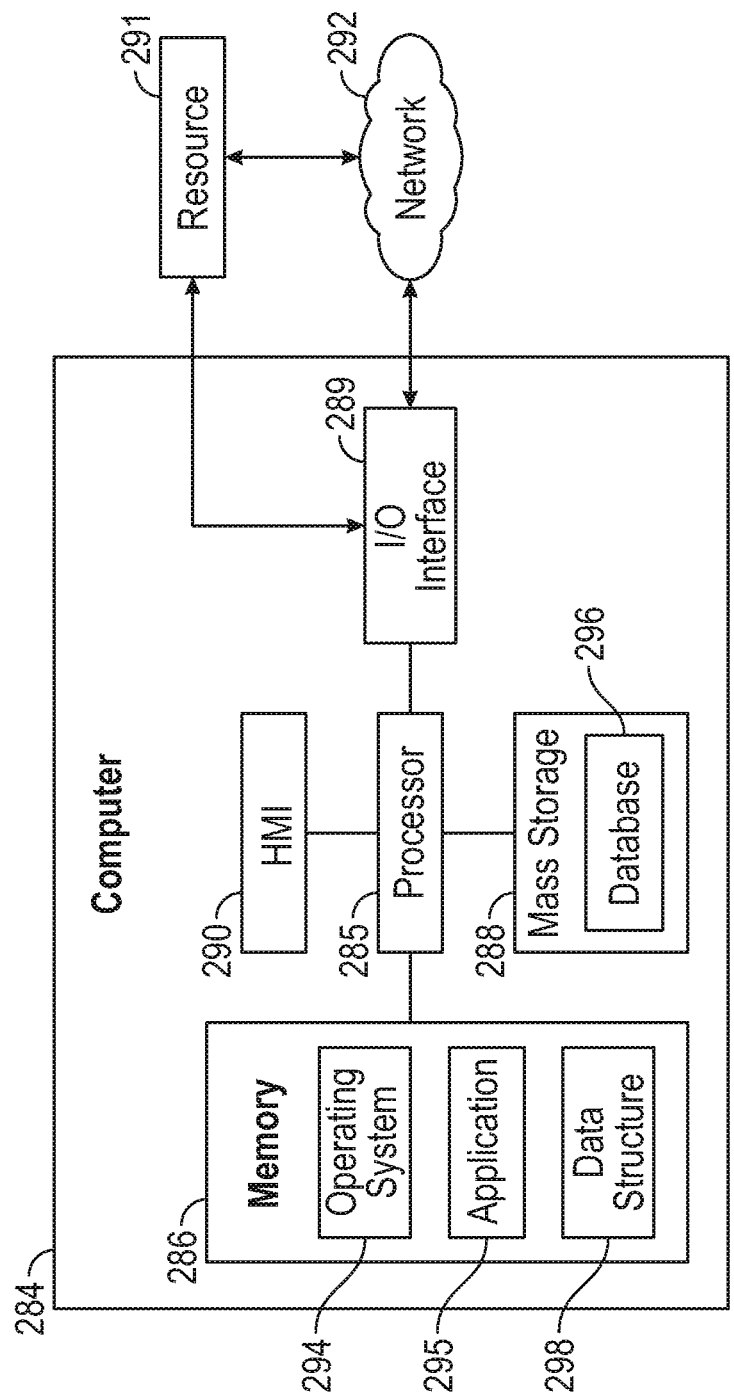
FIG. 5 is a diagrammatic view of an exemplary operating environment for the system shown in FIG. 1.

Referring now to FIG. 5, the transmitting computer 20 and the subscribing computers 22 are implemented on one or more computer devices or systems, such as exemplary computer system 284. The computer system 284 includes a processor 285, a memory 286, a mass storage memory device 288, an input/output (I/O) interface 289, and a Human Machine Interface (HMI) 290. The computer system 284 is operatively coupled to one or more external resources 291 via a network 292 or I/O interface 289. External resources may include, but are not limited to, servers, databases, mass storage devices, peripheral devices, cloud-based network services, or any other suitable computer resource that may be used by the computer system 284.

The processor 285 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 286. Memory 286 includes a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 288 includes data storage devices such as a hard drive, optical drive, tape drive, volatile or non-volatile solid state device, or any other device capable of storing information.

The processor 285 operates under the control of an operating system 294 that resides in memory 286. The operating system 294 manages computer resources so that computer program code embodied as one or more computer software applications, such as an application 295 residing in memory 286, has instructions executed by the processor 285. In an alternative embodiment, the processor 285 executes the application 295 directly, in which case the operating system 294 may be omitted. One or more data structures 298 may also reside in memory 286, and may be used by the processor 285, operating system 294, or application 295 to store or manipulate data.

The I/O interface 289 provides a machine interface that operatively couples the processor 285 to other devices and systems, such as the network 292 or external resource 291. The application 295 thereby works cooperatively with the network 292 or external resource 291 by communicating via the I/O interface 289 to provide the various features, functions, applications, processes, or modules comprising embodiments of the invention. The application 295 has program code that is executed by one or more external resources 291, or otherwise rely on functions or signals provided by other system or network components external to the computer system 284. Indeed, given the nearly endless hardware and software configurations possible, persons having ordinary skill in the art will understand that embodiments of the invention may include applications that are located externally to the computer system 284, distributed among multiple computers or other external resources 291, or provided by computing resources (hardware and software) that are provided as a service over the network 292, such as a cloud computing service.

The HMI 290 is operatively coupled to the processor 285 of computer system 284 in a known manner to allow a user to interact directly with the computer system 284. The HMI 290 may include video or alphanumeric displays, a touch screen, a speaker, and any other suitable audio and visual indicators capable of providing data to the user. The HMI 290 may also include input devices and controls such as an alphanumeric keyboard, a pointing device, keypads, push-buttons, control knobs, microphones, etc., capable of accepting commands or input from the user and transmitting the entered input to the processor 285.

A database 296 resides on the mass storage memory device 288, and may be used to collect and organize data used by the various systems and modules described herein. The database 296 may include data and supporting data structures that store and organize the data. In particular, the database 296 may be arranged with any database organization or structure including, but not limited to, a relational database, a hierarchical database, a network database, or combinations thereof. A database management system in the form of a computer software application executing as instructions on the processor 285 may be used to access the information or data stored in records of the database 296 in response to a query, where a query may be dynamically determined and executed by the operating system 294, other applications 295, or one or more modules.

While the forms of apparatus and methods herein described constitute preferred examples of this invention, it is to be understood that the invention is not limited to these precise forms of apparatus and methods, and the changes may be made therein without departing from the scope of the invention.

What is claimed is:

1. A transmitting computer (20) for a vehicle (18), comprising:
   a command circuit (26) receiving a real-time signal, wherein the command circuit (26) executes a first set of instructions to analyze the real-time signal and generates a plurality of command signals based on executing the first set of instructions;
   a monitor circuit (28) receiving the plurality of command signals and the real-time signal, wherein the monitor circuit (28) executes a second set of instructions to analyze the real-time signal and generates a plurality of replica signals based on executing the second set of instructions, and wherein the monitor circuit (28) generates an initial reset command in response to determining an initial miscompare between one of the plurality of command signals and the plurality of replica signals; and
   a master circuit (30) in communication with both the command circuit (26) and the monitor circuit (28), wherein the master circuit (30):
   receives an indication that the initial reset command is generated;
   in response to receiving the indication, records subsequent signals that each indicate another miscompare has been determined by the monitor circuit (28); and
   in response to receiving a number of reset commands from the monitor circuit (28) equal to a threshold error value during an average mission time of the vehicle (18), generates a disable signal (60) that instructs the command circuit (26) and the monitor circuit (28) to cease operation.

2. The transmitting computer (20) of claim 1, wherein the threshold error value is based on physical characteristics of transistors included within the command circuit (26) and the monitor circuit (28), an average altitude experienced by the vehicle (18), and the average mission time.

3. The transmitting computer (20) of claim 2, wherein the physical characteristics of the transistors included within the command circuit (26) include an effective area of a specific transistor, and wherein the effective area is determined based on a channel width and an effective channel length of the specific transistor.

4. The transmitting computer (20) of claim 1, wherein the first set of instructions executed by the command circuit (26) and the second set of instructions executed by the monitor circuit (28) are performed simultaneously with respect to one another.

5. The transmitting computer (20) of claim 1, wherein the second set of instructions are identical to the first set of instructions.

6. The transmitting computer (20) of claim 1, wherein the command circuit (26) includes a plurality of transmitters (34) that each receive one of the plurality of command signals, and the monitor circuit (28) includes a local hardware counter (80).

7. The transmitting computer (20) of claim 6, wherein the local hardware counter (80) includes a plurality of registers (82) that each correspond to one of the plurality of transmitters (34) of the command circuit (26), and a specific one of the transmitters (34) are disabled in response to incrementing a bit value (88) stored in a corresponding register (82) more than once.

8. The transmitting computer (20) of claim 6, wherein the master circuit (30) includes a master hardware counter (70) storing a hardware counter value (76) that represents the number of reset commands generated by the monitor circuit (28) during the average mission time.

9. The transmitting computer (20) of claim 1, further comprising a reset circuit (32) that receives the initial reset command and reset commands from the monitor circuit (28).

10. A vehicle (18), comprising:
    a plurality of subscribing computers (22); and
    a transmitting computer (20) in communication with the plurality of subscribing computer (22), wherein the transmitting computer (20) includes:
    a command circuit (26) receiving a real-time signal, wherein the command circuit (26) executes a first set of instructions to analyze the real-time signal and generates a plurality of command signals based on executing the first set of instructions;
    a monitor circuit (28) receiving the plurality of command signals and the real-time signal, wherein the monitor circuit (28) executes a second set of instructions to analyze the real-time signal and generates a plurality of replica signals based on executing the second set of instructions, and wherein the monitor circuit (28) generates an initial reset command in response to determining an initial miscompare between one of the plurality of command signals and the plurality of replica signals; and
    a master circuit (30) in communication with both the command circuit (26) and the monitor circuit (28), wherein the master circuit (30):
    receives an indication that the initial reset command is generated;
    in response to receiving the indication, records subsequent signals that each indicate another miscompare has been determined; and
    in response to receiving a number of reset commands from the monitor circuit (28) equal to a threshold error value during an average mission time of the vehicle (18), generates a disable signal (60) that instructs the command circuit (26) and the monitor circuit (28) to cease operation.

11. The vehicle (18) of claim 10, wherein the command circuit (26) includes a plurality of transmitters (34), and wherein the plurality of subscribing computers (22) each include a receiver (38) that is in communication with one of the plurality of transmitters (34).

12. The vehicle (18) of claim 10, wherein the command circuit (26) includes a plurality of transmitters (34) that each receive one of the plurality of command signals, and the monitor circuit (28) includes a local hardware counter (80).

13. The vehicle (18) of claim 12, wherein the local hardware counter (80) includes a plurality of registers (82) that each correspond to one of the plurality of transmitters (34) of the command circuit (26), and a specific one of the transmitters (34) are disabled in response to incrementing a bit value (88) stored in a corresponding register (82) more than once.

14. The vehicle (18) of claim 12, wherein the master circuit (30) includes a master hardware counter (70) storing a hardware counter value (76) that represents the number of reset commands generated by the monitor circuit (28) during the average mission time.

15. The vehicle (18) of claim 10, wherein the threshold error value is based on physical characteristics of transistors included within the command circuit (26) and the monitor circuit (28), an average altitude experienced by the vehicle (18), and the average mission time.

16. The vehicle (18) of claim 15, wherein the physical characteristics of the transistors included within the command circuit (26) include an effective area of a specific transistor, and wherein the effective area is determined based on a channel width and an effective channel length of the specific transistor.

17. A method for operating a computer (20) of a vehicle (18), the method comprising:
receiving, by a command circuit (26) a real-time signal;
executing, by the command circuit (26), a first set of instructions to analyze the real-time signal to generate a plurality of command signals;
receiving, by a monitor circuit (28), the plurality of command signals and the real-time signal;
generating, by the monitor circuit (28), a plurality of replica signals based on executing a second set of instructions to analyze the real-time signal;
in response to determining an initial miscompare between one of the plurality of command signals and the plurality of replica signals, generating an initial reset command by the monitor circuit (28);
recording, by a master circuit (30) subsequent signals received during an average mission time of the vehicle (18) in response to the monitor circuit (28) generating the initial reset command; and
sending a disable signal (60) to both the command circuit (26) and the monitor circuit (28) in response to receiving a number of reset commands from the monitor circuit (28) equal to a threshold error value during the average mission time.

18. The method of claim 17, comprising determining the threshold error value based on physical characteristics of transistors included within the command circuit (26) and the monitor circuit (28), an average altitude experienced by the vehicle (18), and the average mission time.

19. The method of claim 18, wherein the physical characteristics of the transistors included within the command circuit (26) include an effective area of a specific transistor, and wherein the effective area is determined based on a channel width and an effective channel length of the specific transistor.

20. The method of claim 17, comprising executing the first set of instructions by the command circuit (26) and the second set of instructions by the monitor circuit (28) simultaneously with respect to one another.

* * * * *